Figure 1:
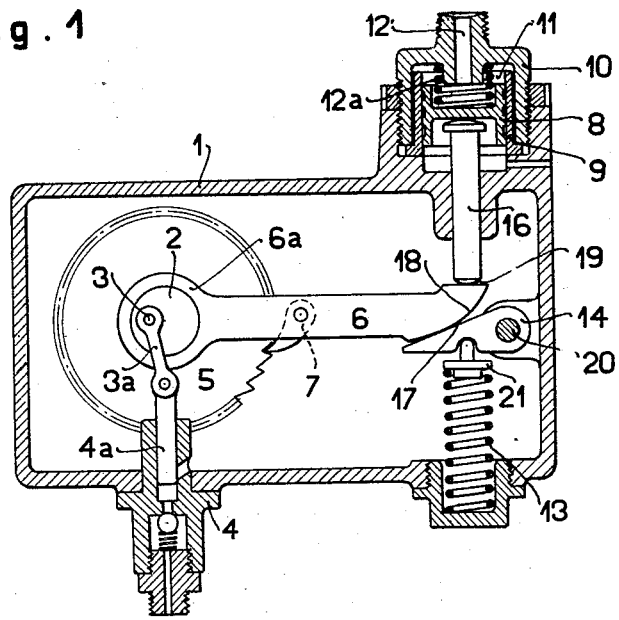

July 5, 1932. O. HAJEK 1,866,206

DRIVING MECHANISM OF LUBRICATING PUMPS

Filed Aug. 27, 1929

Patented July 5, 1932

1,866,206

UNITED STATES PATENT OFFICE

OTTO HAJEK, OF VIENNA, AUSTRIA, ASSIGNOR TO THE FIRM ALEX. FRIEDMANN, OF VIENNA, AUSTRIA

DRIVING MECHANISM OF LUBRICATING PUMPS

Application filed August 27, 1929. Serial No. 388,837.

My invention relates to the driving mechanism of lubricating pumps adapted to supply a lubricant to an engine or any other machine, such as a compressor, with a working cylinder in which a gaseous medium is subjected to varying pressures and in which the lubricating pump itself is driven by means of a piston reciprocating within a small auxiliary cylinder which is in connection with one of the working spaces of the cylinder of the main engine, machine or the like. The variations of the pressure of the gaseous medium within the working cylinder of the main engine or machine are thus transmitted to the auxiliary cylinder and act upon said auxiliary piston which is simultaneously under the influence of a spring and is thus forced to perform a reciprocating movement. In an arrangement of this type it is necessary to damp the movement of the auxiliary piston at the dead centers of the reciprocating movement in such a way that any shock is absorbed. To obtain sufficient damping the above mentioned return spring may be used on one side while on the other side generally a further damping spring is arranged which counteracts the return spring.

A driving mechanism for lubricating pumps of the type mentioned has a number of advantages as it is very simple, inexpensive and compact. Its main advantage, when compared with driving mechanisms deriving the motion of the pump from one of the rotating parts of the engine or machine, consists in that it may be located at any convenient place, a feature of great importance, where the available space is very limited or is very crowded with other accessories.

However, a driving mechanism of the type mentioned has a marked drawback which consists in the fact, that the working stroke of the auxiliary piston is variable with the admission pressure of the fluid or gaseous medium on one hand and with the resistance of the pump on the other hand. This variability of the working stroke of the piston is due to the fact, that while on one hand the admission pressure is very variable the return spring on the other hand exercises always a constant back pressure, which must be sufficiently great to damp the movement of the piston with even the largest gas or fluid pressure occurring and acting upon the surface of the piston. The admission pressure has moreover a lower limit, determined by the resistance of the lubricating pump, that must be overcome in addition to that of the return spring. Therefore, the position of the lower dead center of the auxiliary piston will always vary and the quantity of lubricating fluid delivered at the stroke of the piston will also vary consequently within wide limits with the variation of the admission pressure of the driving fluid, thus impairing the economy and efficiency of the lubrication.

It is an object of my invention to improve a driving mechanism of the type described in such a way that these defects will disappear. One feature of my invention therefore consists in arranging the return spring for the auxiliary piston in such a way that it does not act directly on said piston but acts upon a system of intermediate links and levers cooperating with each other, so that the pump operating stroke of the auxiliary piston effected against the pressure of the return spring is a constant one and comprises the larger part of the entire stroke, while during the minor part of the stroke which comprises only a small fraction thereof the force necessary for overcoming the pressure of the spring will constantly increase, so that any shock that may happen to occur when the piston is about to reach the dead center, will be sufficiently damped or suppressed.

My invention is illustrated in the accompanying drawing, in which

Figure 2:
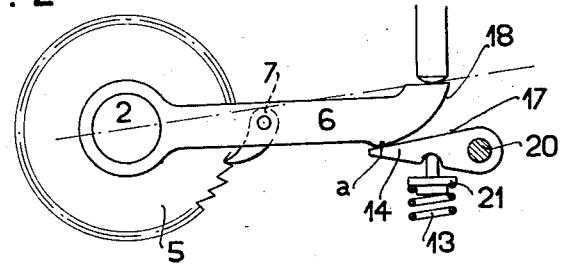
Figure 3:
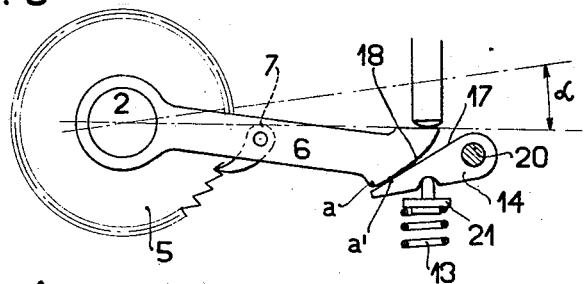
Figure 4:
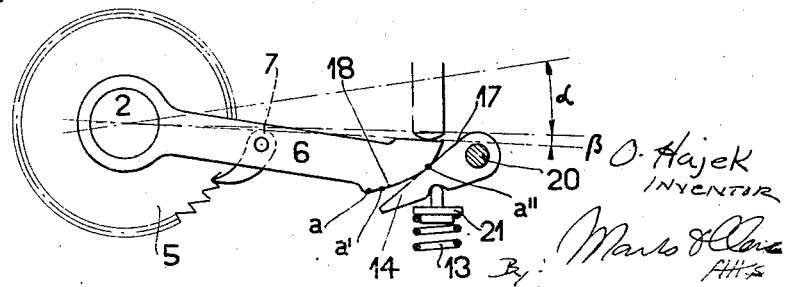

Fig. 1 shows a section through a lubricating pump and the driving parts thereof, while Figs. 2, 3 and 4 are detail views illustrating various positions of said driving parts during their operation.

The arrangement illustrated comprises a casing 1 for housing the pump proper 4 and the various driving mechanisms, the pump 4 being either integral with the casing or preferably formed as a separate piece, passing through a suitable boring of the same, fixed to the casing by means of screws or the like. Said pump 4 may be of any approved type comprising a plunger or piston 4a which by means of a driving rod or link 3a is connected with a crank or eccentric 3 mounted upon a driving shaft 2. Said shaft is driven by means of a ratchet mechanism 5, 7, which consists of a ratchet wheel 5, keyed upon the shaft 2, while the pawl 7, which advances the ratchet wheel stepwise, is mounted upon a driving lever 6 that is fulcrumed upon the shaft 2 and is provided with a head 6a which is carried by the shaft but is free to oscillate or rock upon it. Of course a plurality of pumps 4 with plungers 4a may be arranged which are all driven by the same shaft 2 but only one pump is illustrated in the figure.

The driving lever 6 is actuated by means of a reciprocating piston 8 arranged within a suitable cylinder 9 formed by a bushing of suitable material which is held in its place by means of a cup shaped member or cap 10, screwed onto the casing 1. Said cap 10 is provided with a duct or channel 12 which may connect the working space 11 of the cylinder 9 with a small pipe leading to the working space of the cylinder of the main engine, compressor or other machine (not illustrated) with which the lubricating pump is associated. A spring 12a also acts upon the piston within the working space 11 of the auxiliary cylinder 9, which is open to the channel 12 and said spring damps or takes up any shock which the piston may be subjected to when returned in its original position, after having performed its working stroke.

The piston may thus make its working stroke under the influence of the pressure of the gaseous medium, whenever this pressure increases in the main engine, compressor or other machine and passing through the connecting pipe and channel 12 into the working space 11 of the cylinder 9 to press upon one side of the piston. The return movement of the piston is effected by means of a return spring 13, which is compressed during the working stroke but after relieving the pressure in the space 11 will become effective. Thus the piston 8 is reciprocated within the auxiliary cylinder 9 almost or entirely in phase with the reciprocating movement of the piston in the main engine.

The spring 13 can be of lighter construction than in arrangements hitherto known for reasons which will hereafter appear. It does not act directly upon the piston 8 but only by means of intermediate links which consist of a tappet rod which bears against a suitable pressure face 19 of the driving lever 6. Said driving lever is in its turn provided with a rolling surface 18 which cooperates with another rolling surface 17 arranged on a rocking lever or actuating cam 14 which is fulcrumed upon a bolt 20 carried by suitable eyes in the casing 1. The return spring for the auxiliary piston 8 acts by means of a disc 21 which carries a knife edge or the like bearing upon said lever 14, while it is supported at its other end by the casing 1 itself or by a suitable cap screwed into the same.

The actuating cam or lever 14 acted upon by the spring 13 is thus in a permanent positive but spring controlled connection with the auxiliary piston 8 which holds said parts in suitable relation.

It will be seen that when during the various working phases of the engine the pressure increases, the gaseous medium will act through the pipe (not shown) and through the channel 12 on the auxiliary piston 8 and will thus cause the piston 8 to make a forward stroke whereby the tappet stem 16 will act upon the driving lever 6 and will advance the pawl 7 which engages with the teeth of the ratchet wheel 5 and thus causes an angular movement of the driving shaft 2. Upon decrease of pressure in the working space of cylinder 9 the piston is returned by means of the spring 13 to its original position and the pawl 7 glides in this case over the teeth of the ratchet wheel and comes finally into engagement with the next tooth at the end of the returning stroke, so that it is ready for further advance of the ratchet wheel in the desired direction.

In the upper dead center position of the piston the rolling surface 18 of the driving lever 6 and the rolling surface 17 of the actuating cam or lever 14 will be in contact with each other at the place marked "a" in Figs. 2—4 of the drawing. While the piston 8 is performing its forward stroke on account of the raising of the pressure in the space 11 the rolling surface 18 of the lever 6 rolls upon the surface 17 of the actuating cam or lever 14. The shape of the rolling surfaces 18 and 17, however, is so chosen, that during a definite part of the piston stroke the points of contact between the rolling surfaces 18 and 17 are shifted only for a very little distance.

To illustrate this reference is made to Fig. 3 where the positions of the parts are shown at the end of the working stroke during which the driving lever 6 has been moved through the angle α. During this movement which comprises the largest part of the stroke the point of contact between the rolling surfaces 18 and 17 was only shifted from $a$ to $a'$ and has therefore travelled only for a very small distance.

This has the effect that the lever arm with which the piston is pressing on the spring 13 remains practically the same during this part of the stroke and if the spring is of such a size that the increase of pressure of the gaseous medium in the main engine or machine will be able to overcome the resistance of the pump and said spring pressure even if it is comparatively small, then the piston will always be able to reach this position so that the stroke up to this point will always be constant.

The remainder of the stroke is illustrated in Fig. 4, which shows the parts in their relative position in the lower dead center of the stroke of the piston. The rolling surfaces 18 and 17 are now in contact at the point $a''$ which is now very near the fulcrum 20 of the lever 14. During the shifting of the point of contact between the rolling surfaces 18 and 17 from $a'$ to $a''$ the driving lever 6 has made a movement around an angle $\beta$ which is only very small when compared with the angle $\alpha$. During this movement which may be termed the damping part of the stroke, the lever arm, with which the pressure upon the piston 8 is overcoming the pressure of the spring 13, decreases rapidly and the effect of the spring pressure which is opposing the movement of the piston thereby increases. Thus the movement of the piston 8 during the damping part of the stroke (movement of the lever 6 through the angle $\beta$) reaches without shock the lower dead center and it is manifest from the above that even very high pressures acting upon the piston 8 are taken up without any shock during this part of the stroke near the dead center of the same. The returning spring 13 must therefore only be of such dimensions and shape that the return stroke of the driving lever 6 and the piston 8 is obtained without fail.

During the working stroke corresponding to the rocking of the driving lever 6 through the angle $\alpha$ the driving power of the piston 8 will therefore be utilized almost completely for actuating the lubricating pump and only during a very small part of the stroke corresponding to the small angle $\beta$ the counterpressure of the spring though comparatively light, will have, on account of the decrease of the lever arm upon which the piston is pressing, which is due to the shifting of the contact point from $a'$ to $a''$, a comparatively strong effect which is utilized for shock absorbing purposes.

Thus it will be seen that the main point of my invention consists in the fact that the comparatively small power with which the return spring 13 will act on the piston 8 through the medium of the intervening links is substantially maintained at constant value during a definite part (corresponding to the angle $\alpha$) of the stroke of the auxiliary piston while during another but very small part of the stroke (corresponding to the angle $\beta$) said power will constantly increase until the lower dead center is reached. Whatever may be the admission pressure of the gaseous medium driving the auxiliary piston 8 that part of the working stroke that corresponds to the rocking of the lever 6 through an angle $\alpha$ will always be reached with safety and therefore always the same actuation of the lubricating pump will occur at each stroke of the auxiliary piston. Thus also always the same quantity of lubricating liquid will be forced into the driven engine, compressor or other machine. Though the part of the stroke which corresponds to an angular movement of the lever 6 through the angle $\beta$ may vary a little with the admission pressure of the gases, this is of no practical consequence as this part of the stroke is very small when compared with the main part (corresponding to the angle $\alpha$) and it will always be possible by suitably shaping the rolling surfaces 18 and 17 to have the possible variations held within such narrow limits that they will not appreciably influence the total quantity of delivered lubricant.

Various modifications of the system shown may be made without departing from the essence of the invention and I do not limit myself to the example shown which illustrates only one of the several modifications that are possible and which will realize my invention.

What I claim is:

1. In a lubricating pump mechanism of the kind specified adapted to be driven by the pressure of a gaseous medium subjected to varying pressures, an auxiliary driving cylinder and a piston therein, said piston performing a working stroke under the influence of the pressure of the gaseous medium entering the auxiliary cylinder, a lubricating cylinder and piston, the latter adapted to be driven by the reciprocating piston in the auxiliary cylinder, a return spring acting upon the piston in the auxiliary cylinder, a transmitting mechanism inserted between said spring and said piston adapted to vary the effect of the back pressure exerted by the spring on said piston during part of the return stroke, said mechanism comprising a power transmitting means adapted to keep said effect at an approximately constant value during one part of the stroke and further adapted to increase said effect during another portion of the stroke.

2. In a driving mechanism for lubricating pumps of the kind specified adapted to be driven from a machine having a working cylinder in which the pressure of a gaseous medium is varying, an auxiliary driving cylinder for said lubricating pump communicating with the working cylinder of the machine to be lubricated, a piston within said auxiliary cylinder subjected on one side to the varying pressure of the gaseous medium, and on the other side to the action of a return spring counteracting said pressure and performing a working stroke under the influence of the increasing pressure while compressing during said stroke the return spring, a transmitting mechanism between said return spring and said piston, said transmitting mechanism comprising power transmitting means for keeping at the beginning of each working stroke the effect of the back pressure of the return spring on said piston at a constant value during the larger portion of the working stroke and for increasing said effect during a successive and rapidly said effect during a successive and rapidly short portion of the stroke near the dead center at the end of the working stroke.

3. In a driving mechanism of the type specified for lubricating pumps adapted to be driven from and to lubricate a machine with a working cylinder in which the pressure of a gaseous medium is varying, an auxiliary driving cylinder for said lubricating pump in open communication with the working cylinder of the machine to be lubricated, a piston therein subjected on one side to the influence of the pressure of the gaseous medium within said auxiliary cylinder and performing its working stroke under this influence, said piston being subjected on the other side to the influence of a return spring to be compressed during said working stroke and returning the piston to its original position after the disappearance of the pressure of the gaseous medium, a lever system adapted to vary the active length of the lever arm of the point of application of said piston between said piston and the return spring the lever arm being approximately invariable during the first part of the working stroke and the lever arm shortening rapidly during a second part of the stroke near the dead center of the stroke thus keeping the effect of the back pressure of the return spring on said piston at a constant value during one part of the stroke while raising said effect rapidly during the second part of the stroke.

4. In a driving mechanism of the type specified for lubricating pumps adapted to be driven from and to lubricate a machine with a working cylinder in which the pressure of a gaseous medium is varying, an auxiliary driving cylinder for said lubricating pump in open communication with the working cylinder of the machine to be lubricated, a piston therein subjected on one side to the influence of the pressure of the gaseous medium within said auxiliary cylinder and performing its working stroke under this influence, said piston being subjected on the other side to the influence of a return spring to be compressed during said working stroke and returning the piston to its original position after the disappearance of the pressure of the gaseous medium, a lever system with variable lever arms between said return spring and said piston, said lever system comprising rolling surfaces adapted to shift their point of contact during their movement, the rolling surfaces being so shaped that the point of contact is shifted slowly only for a very small distance during the larger part of the working stroke, but is shifted rapidly and for a large distance during a short part of the working stroke near its dead center thus keeping the effect of the back pressure of the return spring on the piston approximately constant for the effective part of the working stroke, while causing a rapidly increasing influence of said back pressure for damping purposes near the dead center of the stroke.

5. In a driving mechanism for lubricating pumps of the kind specified adapted to be driven from and to lubricate a machine with a working cylinder in which the pressure of a gaseous medium is varying, an auxiliary driving cylinder for said lubricating pump communicating with the working cylinder of the machine to be lubricated, a piston therein, subjected on one side to the varying pressure of the gaseous medium entering the auxiliary cylinder and performing a working stroke under its influence, and acting on the other side on a driving lever for the lubricating pump and on a return spring simultaneously, a transmitting mechanism between said return spring and said piston adapted to transmit the back pressure of the return spring to said piston when compressed during said working stroke, said transmitting mechanism comprising means for keeping the effect of the back pressure of the return spring on said piston at an approximately constant value and further including rolling surfaces, one of said rolling surfaces being formed upon the driving lever for the lubricating pump.

6. In a driving mechanism for lubricating pumps according to claim 5, an actuating cam, subjected directly to the pressure of the return spring and a second rolling surface upon said actuating cam.

7. In a driving mechanism for lubricating pumps according to claim 5, an actuating cam provided with a rolling surface co-operating with the rolling surface on the driving lever and having a varying point of contact with the same during the performance of the working stroke, said actuating cam being pressed against said driving lever directly under the influence of the return spring.

In testimony whereof I affix my signature.

OTTO HAJEK.